(12) United States Patent
Worley

(10) Patent No.: US 11,009,093 B2
(45) Date of Patent: May 18, 2021

(54) ELECTRONICALLY ADJUSTABLE SHOCK ABSORBER

(71) Applicant: SUSPENSION DIRECT, INC., Lake Elsinore, CA (US)

(72) Inventor: Dan J. Worley, Lake Elsinore, CA (US)

(73) Assignee: SUSPENSION DIRECT, INC., Lake Elsinore, CA (US)

(*) Notice: Subject to any disclaimer, the term of this patent is extended or adjusted under 35 U.S.C. 154(b) by 179 days.

(21) Appl. No.: 15/831,010

(22) Filed: Dec. 4, 2017

(65) Prior Publication Data

US 2019/0113096 A1  Apr. 18, 2019

Related U.S. Application Data

(60) Provisional application No. 62/606,929, filed on Oct. 16, 2017.

(51) Int. Cl.

| | |
|---|---|
| *F16F 9/06* | (2006.01) |
| *F16F 9/32* | (2006.01) |
| *B60G 17/08* | (2006.01) |
| *B60G 17/015* | (2006.01) |
| *F16F 9/34* | (2006.01) |
| *F16F 9/50* | (2006.01) |
| *B60G 17/0165* | (2006.01) |
| *F16F 9/46* | (2006.01) |
| *B60G 13/08* | (2006.01) |

(52) U.S. Cl.
CPC .......... *F16F 9/065* (2013.01); *B60G 17/0152* (2013.01); *B60G 17/0165* (2013.01); *B60G 17/08* (2013.01); *F16F 9/3271* (2013.01); *F16F 9/34* (2013.01); *F16F 9/466* (2013.01); *F16F 9/50* (2013.01); *B60G 13/08* (2013.01); *B60G 2206/80* (2013.01); *B60G 2500/10* (2013.01); *B60G 2800/162* (2013.01); *F16F 2226/04* (2013.01); *F16F 2228/066* (2013.01)

(58) Field of Classification Search
CPC ........ F16F 9/34; F16F 9/466; F16F 2228/066; F16F 9/065; F16F 9/3271; F16F 2226/04; F16F 9/50; B60G 17/0152; B60G 17/0165; B60G 17/08; B60G 13/08; B60G 2206/80; B60G 2500/10; B60G 2800/162
USPC ......................................................... 188/281
See application file for complete search history.

(56) References Cited

U.S. PATENT DOCUMENTS

| | | | |
|---|---|---|---|
| 3,487,417 A | 12/1969 | Morgan | |
| 3,690,540 A | 9/1972 | Hardigg | |
| 4,650,042 A | 3/1987 | Knecht | |
| 4,702,490 A * | 10/1987 | Yamaguchi | ........ B60G 17/0152 267/64.16 |

(Continued)

*Primary Examiner* — Thomas J Williams
*Assistant Examiner* — James K Hsiao

(57) ABSTRACT

A mechanism for electronically adjusting a shock absorber includes a cartridge that is located on the fluid path between the main body of the shock absorber and a damping reservoir. A piston valve is mounted for reciprocal movement inside an elongated chamber of the cartridge, and a solenoid is mounted on the cartridge to interact with the piston valve. In operation, the solenoid is electronically controlled to selectively move the piston valve into various positons in the cartridge chamber to thereby vary the volume of liquid flow along the fluid path which will adjust the response characteristics of the shock absorber.

20 Claims, 3 Drawing Sheets

(56) References Cited

U.S. PATENT DOCUMENTS

| | | | | |
|---|---|---|---|---|
| 4,743,000 A * | 5/1988 | Karnopp | B60G 17/0152 | 188/266.5 |
| 4,903,983 A * | 2/1990 | Fukushima | B60G 17/0162 | 280/5.503 |
| 5,085,459 A * | 2/1992 | Sato | B60G 17/018 | 280/5.5 |
| 5,092,625 A * | 3/1992 | Kawabata | B60G 17/0185 | 280/5.501 |
| 5,105,358 A * | 4/1992 | Takase | B60G 17/017 | 280/5.507 |
| 5,150,917 A * | 9/1992 | Kawabata | B60G 17/016 | 280/124.157 |
| 5,396,973 A * | 3/1995 | Schwemmer | F16F 9/38 | 188/266.2 |
| 5,480,011 A * | 1/1996 | Nagai | F16F 9/46 | 188/266.3 |
| 5,522,484 A | 6/1996 | Sawai | | |
| 5,941,508 A * | 8/1999 | Murata | B60G 17/044 | 267/64.17 |
| 6,092,816 A * | 7/2000 | Sekine | B60G 17/0152 | 267/64.17 |
| 6,279,702 B1 | 8/2001 | Koh | | |
| 8,056,392 B2 | 11/2011 | Ryan | | |
| 8,534,687 B2 * | 9/2013 | Coombs | B60G 17/08 | 280/124.16 |
| 9,228,630 B2 * | 1/2016 | Coaplen | F16F 9/3257 | |
| 10,415,662 B2 * | 9/2019 | Marking | F16F 9/18 | |
| 2005/0077131 A1 * | 4/2005 | Russell | F16F 9/065 | 188/314 |
| 2006/0124414 A1 * | 6/2006 | Hanawa | B62K 25/08 | 188/314 |
| 2008/0250844 A1 * | 10/2008 | Gartner | F16F 9/3264 | 73/11.07 |
| 2010/0066051 A1 * | 3/2010 | Haugen | B60G 13/14 | 280/124.157 |
| 2010/0326780 A1 * | 12/2010 | Murakami | F16F 9/187 | 188/322.13 |
| 2011/0079475 A1 * | 4/2011 | Roessle | B60G 17/08 | 188/266.5 |
| 2011/0147148 A1 * | 6/2011 | Ripa | F16F 9/44 | 188/322.13 |
| 2011/0315494 A1 * | 12/2011 | Marking | F16F 9/46 | 188/281 |
| 2012/0018263 A1 * | 1/2012 | Marking | F16F 9/065 | 188/266.2 |
| 2013/0144489 A1 * | 6/2013 | Galasso | B60G 17/018 | 701/37 |
| 2013/0228404 A1 * | 9/2013 | Marking | F16F 9/466 | 188/266.2 |
| 2013/0275003 A1 * | 10/2013 | Uchino | B60G 17/06 | 701/40 |
| 2013/0341140 A1 * | 12/2013 | Nakajima | F16F 9/325 | 188/315 |
| 2014/0000448 A1 * | 1/2014 | Franklin, III | F16F 9/56 | 91/4 R |
| 2014/0125018 A1 | 5/2014 | Brady | | |
| 2014/0216871 A1 * | 8/2014 | Shibahara | B61F 5/24 | 188/313 |
| 2014/0231200 A1 * | 8/2014 | Katayama | F16F 9/325 | 188/314 |
| 2014/0284156 A1 * | 9/2014 | Kim | F16F 9/512 | 188/314 |
| 2014/0353938 A1 * | 12/2014 | Marble | B60G 11/26 | 280/124.157 |
| 2015/0276001 A1 * | 10/2015 | Keil | F16F 9/34 | 188/313 |
| 2015/0316117 A1 * | 11/2015 | Kim | F16F 9/34 | 188/266.6 |
| 2016/0169251 A1 * | 6/2016 | Prouzet | B64C 1/1407 | 74/99 R |
| 2017/0211651 A1 * | 7/2017 | Jung | F16F 9/34 | |
| 2018/0010666 A1 * | 1/2018 | Marking | F16F 9/18 | |

\* cited by examiner

ELECTRONICALLY ADJUSTABLE SHOCK ABSORBER

This application claims the benefit of U.S. Provisional Patent Application Ser. No. 62/606,929, filed Oct. 16, 2017. The entire contents of Application Ser. No. 62/606,929 are hereby incorporated by reference herein.

FIELD OF THE INVENTION

The present invention pertains generally to shock absorbers. More particularly, the present invention pertains to a shock absorber that can be electronically adjusted during its operation. The present invention is particularly, but not exclusively, useful as a shock absorber that adjusts its response characteristics by increasing or decreasing the cross-section area of a fluid flow path from the main body of the shock absorber in response to movements of a valve member substantially perpendicular to the fluid flow path.

BACKGROUND OF THE INVENTION

Shock absorbers for vehicles typically function by forcibly moving an incompressible liquid back and forth on a fluid path in response to its interaction with a compressible gas. In detail, while the gas is being compressed by the moving force of the liquid, the gas reacts as a spring in response to this movement. On the other hand, as the compressed gas is allowed to expand in reaction to the moving liquid, it forces the liquid to return to a force neutral position on the fluid path. It is also known that some devices for a similar purpose are configured much like a conventional dash pot.

Heretofore, the general approach for adjusting the response characteristics of a shock absorber has been to modify the fluid path by moving an in-line valve member directly along the fluid path. More specifically, this has been accomplished by increasing or decreasing the in-line cross-section area of the fluid path.

The present invention, however, recognizes that the responsive characteristics of a shock absorber can be more easily adjusted, against lower reactive forces, by moving a valve member (e.g. a piston valve) in directions perpendicular to that of the fluid path. Moreover, the present invention recognizes that with lower reactive forces from fluid flow in a shock absorber, the valve member can be electronically controlled with greater precision and resolution than can be accomplished using more conventional inline valves.

In light of the above, an object of the present invention is to provide an adjustable shock absorber that varies the response characteristics of a shock absorber by effectively moving a valve member in a direction substantially perpendicular to the shock absorber's fluid path. Still another object of the present invention is to provide an adjustable shock absorber that can be electronically adjusted during an operation of the shock absorber. Yet another object of the present invention is to provide an electronically adjustable shock absorber that is simple to install, is easy to operate and is comparatively cost effective.

SUMMARY OF THE INVENTION

In accordance with the present invention, a mechanism for adjusting the response characteristics of a shock absorber functions by varying the volume of fluid flow through the mechanism. In general, a shock absorber will typically include a main body for holding a liquid (e.g. a hydraulic/mineral type oil). It will also include a shock shaft which is attached to a drive piston that is engaged with the main body and is positioned for movement of the drive piston against the liquid in the main body. In this combination, the main body is attached to a first point on a vehicle (i.e. the chassis) and the shock shaft is attached to a second point on the vehicle (i.e. an axel). Also, a bridge manifold is included to connect the main body of the shock absorber in fluid communication with a damping reservoir, via a fluid path.

The damping reservoir of the present invention includes a gas chamber and a liquid chamber. A floating piston is positioned between these two chambers in the damping reservoir. Movement of the floating piston will therefore compress gas in the gas chamber when liquid is introduced into the liquid chamber, and it will expel liquid form the liquid chamber when gas expands in the gas chamber.

An important component of the present invention is a cartridge which is located in the fluid path between the main body of the shock absorber and the liquid chamber of the reservoir. Structurally, the cartridge is formed with an elongated cylindrical chamber, and it has at least one, but preferably more, opening(s) into the chamber. A piston valve is located inside the chamber of the cartridge, and it is moveable in the chamber to establish an open/close configuration for the opening(s). For the present invention, movements of the piston valve are responsive to a solenoid with control inputs to the solenoid provided by an Electronic Control Unit (ECU). With this interaction, once the piston valve has been moved, its position in the cartridge will increase or decrease the cross-section area of the opening(s) into the chamber. This will then determine the volume of liquid flow on the fluid path between the shock absorber and the liquid chamber of the damping reservoir.

Structurally, the piston valve includes a hollow central tube which defines a longitudinal axis and has a distal end and a proximal end. A first ring is mounted at the distal end of the central tube, and a second ring is mounted at its proximal end. Dimensionally, the central tube has an outer diameter $d_{tube}$ and the rings each have an outer diameter $d_{ring}$, wherein $d_{ring} > d_{tube}$. In this combination a recess is formed around the central tube between the distal ring and the proximal ring. As disclosed above, this recess defines a portion of the flow path through the cartridge.

In their cooperation with the cartridge, the first and second rings of the piston valve abut against the cartridge from inside its chamber. Thus, as the piston valve is moved by the solenoid inside the chamber of the cartridge it will cause the rings to vary the cross-section area of the opening(s) into the recess of the piston valve as the rings pass by the opening(s). In effect, this changes the particular opening(s) in their transition between open/closed configurations. The result is that changes in the cross-section area of openings allow more or less fluid to pass through the recess of the piston valve. Stated differently, this adjusts the volume of the liquid flow through the recess of the cartridge, to either stiffen or soften the response characteristics of the shock absorber.

In a preferred embodiment of the present invention, the first and second rings of the piston valve are each formed with a taper or a notch. Specifically, this is done to provide for an incremental transition in the size of the cross-section area of the opening between the open/close configurations. The benefit here is essentially two-fold. For one, a taper/notch on the rings alleviates an abrupt change in the fluid flow. For another, a more gradual change in fluid flow capacity allows the solenoid that is moving the piston valve to do so with improved resolution.

An important structural feature of the present invention is the direction by which fluid enters the chamber of the cartridge through the opening(s) of the cartridge. Specifically, the direction of fluid entry is perpendicular to the direction in which the piston valve moves in the cartridge chamber. Furthermore, the direction of fluid entry is preferably offset from the longitudinal axis of the piston valve. Thus, liquid (fluid) enters the recess created between the rings of the piston valve in a direction that is tangential to the cross-section of the piston valve. Accordingly, the direction of fluid (liquid) entry into the cartridge is preferably both perpendicular to the axis of the piston valve, and tangential to its cross-section.

The benefits of the above described direction of fluid (liquid) flow into the cartridge is at least two-fold. For one, the forces that are initially exerted against the rings of the piston valve movement are neutralized in the direction of piston valve travel. This, in turn, facilitates axial movement of the piston valve by the solenoid. For another, the tangential path (i.e. axial offset) for fluid (liquid) entry into the recess minimizes the distortion effect on the piston valve that would otherwise result from the impact of a force directed toward the axis of the piston valve.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
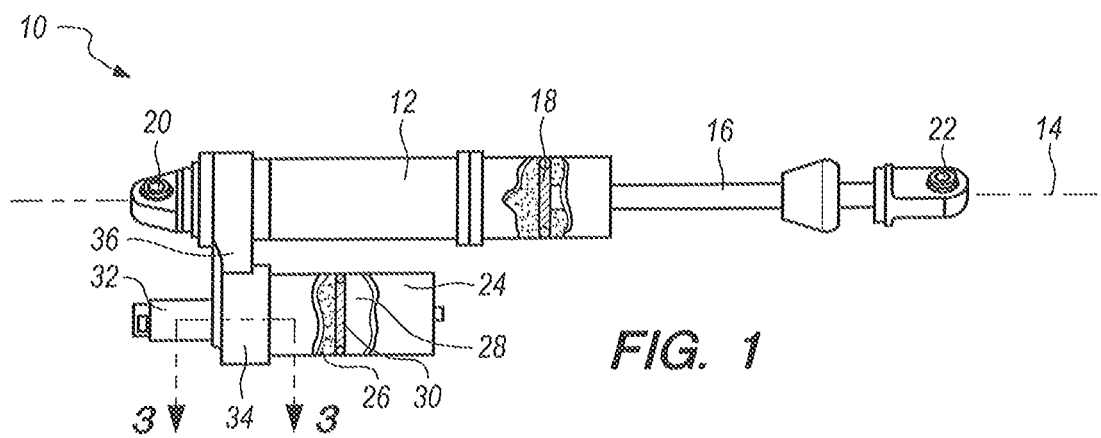
FIG. 1 is a side view of a shock absorber with portions broken away for clarity.

Referring initially to FIG. 1, a shock absorber of a type well known in the pertinent art is shown and is designated 10. As shown, the shock absorber 10 includes a main body 12 for holding a liquid such as a hydraulic/mineral type oil. The main body 12 of the shock absorber 10 defines a longitudinal axis 14, and a shock shaft 16 with a drive piston 18 which is engaged with the main body 12 for reciprocal back-and-forth movement along the axis 14. As also shown in FIG. 1, the shock absorber 10 includes an eye 20 on the main body 12 at one end of the shock absorber 10, and an eye 22 on the shock shaft 16 at the other end of the shock absorber 10. As envisioned for the present invention, the eye 20 will typically be attached to the chassis of a vehicle (not shown) and the eye 22 will be attached to an axel of the vehicle.

FIG. 1 also shows that the shock absorber 10 includes a damping reservoir 24. As shown, the damping reservoir 24 includes both a liquid chamber 26 and a gas chamber 28 that are separated from each other by a floating piston 30. Further, a solenoid 32 and a solenoid valve 34 are shown attached to the damping reservoir 24. In this combination, the liquid chamber 26 of the damping reservoir 24 is connected in fluid communication with the main body 12 of the shock absorber 10 via the solenoid valve 34. Structurally, this connection is established by a bridge manifold 36 or a hose (not shown).

Figure 2:
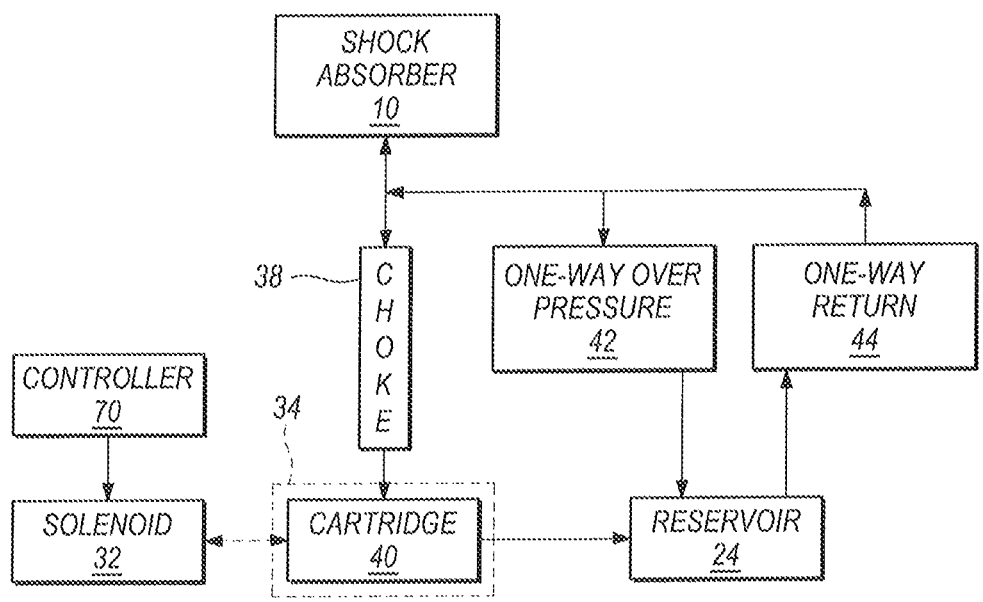
FIG. 2 is a schematic presentation of operative components for the present invention showing the directions of fluid flow paths (solid lines) and mechanical activations (dashed lines) relative to the cartridge of the present invention.

An overall appreciation of the fluid flow paths involved for the present invention will be best provided with reference to FIG. 2. This appreciation will necessarily be based on an understanding that very high pressures are generated during an operation of the shock absorber 10. With this in mind, FIG. 2 shows that a choke valve 38 is established in the bridge manifold 36 between the main body 12 of shock absorber 10 and the solenoid valve 34. Specifically, the function of the choke valve 38 is to reduce the fluid force exerted on the solenoid valve 34 during an operation of the shock absorber 10. More particularly, the reduction in force magnitude provided by the choke valve 38 is needed to minimize adverse effects on the cartridge 40 which is part of the solenoid valve 34.

Also, with pressure considerations in mind, a one-way, overpressure valve 42 is provided to further relieve adverse pressures on the solenoid valve 34 should there be a spike value in pressure that cannot be suppressed by the choke valve 38. In this instance, an operation of the overpressure valve 42 would allow for a bypass of liquid into the liquid chamber 26 of the damping reservoir 24, rather than against the cartridge 40. On the other hand, to prevent an overpressure against the cartridge 40 from liquid in the damping reservoir 24, a one-way return valve 44 is provided. As intended for the present invention, both the overpressure valve 42 and the return valve 44 are established with threshold pressure values before they become operative.

Figure 3:
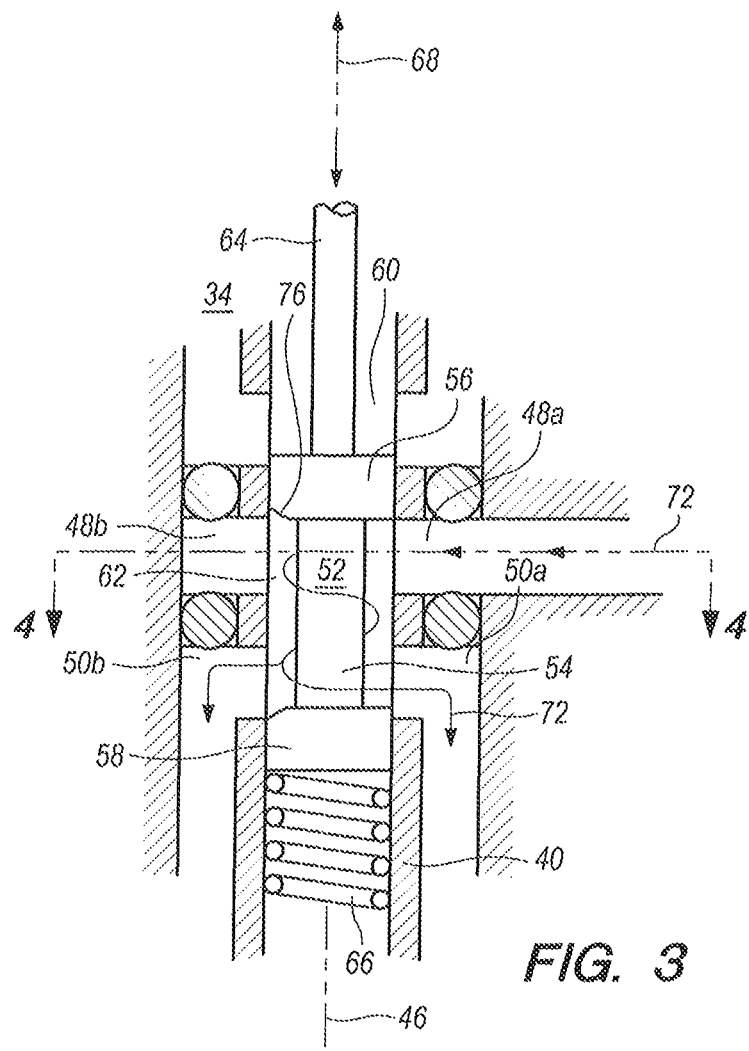
FIG. 3 is a side cross-section view of a cartridge in accordance with the present invention showing its interaction with a piston valve for controlling liquid flow through the cartridge as seen along the line 3-3 in FIG. 1.

Referring now to FIG. 3 it will be seen that the cartridge 40 of solenoid valve 34 defines a longitudinal axis 46. FIG. 3 also shows that the cartridge 40 is formed with a plurality of openings, of which the openings 48a, 48b, 50a and 50b are exemplary. It will also be seen that a piston valve 52 which includes a central tube 54 with a ring 56 at one end, and a ring 58 at its other end, is positioned inside a chamber 60 of the cartridge 40. In this combination, a recess 62 formed between the rings 56 and 58, and between the outer surface of central tube 54 and the inside surface of the chamber 60.

Still referring to FIG. 3, a connector 64 is shown attached to the ring 56 of piston valve 52. Also, a spring 66 is shown urging against the ring 58 of piston valve 52. In combination, the connector 64 is activated by the solenoid 32 to move the piston valve 52 back-and-forth inside the chamber 60 in the directions indicated by arrow 68. Thus, the activation of piston valve 52 by the solenoid 32 will be in opposition to the force exerted by spring 66 on the piston valve 52. The consequence here is that in response to movements of the piston valve 52 by solenoid 32, the openings 48 and 50 can be selectively opened or closed by the rings 56 and 58 of the piston valve 52. In accordance with the present invention, a controller 70 (see FIG. 2), such as an Electronic Control Unit (ECU), actually controls the flow of fluid (liquid) through the cartridge 40 by operating the solenoid 32. As envisioned for the present invention, this control may be either by direct or wireless connections between the controller 70 and the solenoid 32.

Figure 4:
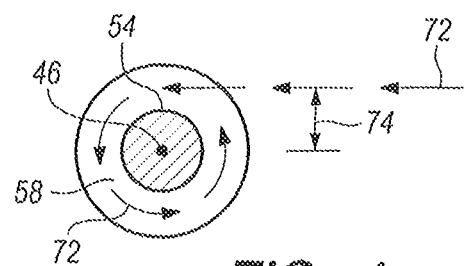
FIG. 4 is an axially directed view of liquid flow into and through the recess of the piston valve as seen along the line 4-4 in FIG. 3.

The flow of fluid (liquid) through the solenoid valve 34 between the main body 12 of the shock absorber 10 and the liquid chamber 26 of the damping reservoir 24 will be best appreciated with reference to both FIGS. 3 and 4. For this purpose, consider fluid flow through the cartridge 40 as represented by the arrows 72. As shown, the arrows 72 indicate that fluid flow will enter the recess 62 of cartridge 40 through the opening 48a. With reference to FIG. 4, it is shown that fluid entry into the recess 62 is in a direction perpendicular to the longitudinal axis 46 of the solenoid valve 34. Also, it is shown in FIG. 4 that fluid entry into the solenoid valve 34 is at an offset distance 74 from the longitudinal axis 46. Thus, the direction of fluid (liquid) entry into the cartridge 40 indicated by arrows 72 is preferably both perpendicular to the axis 46 of the piston valve 52, and tangential to a cross-section of the central tube 54. The forces that are initially exerted against the piston valve 52 are thereby neutralized in the direction of travel for the piston valve 52 indicated by the arrow 68. This, in turn, facilitates axial movement of the piston valve 52 in the direction of arrow 68 by the solenoid 32. This axial movement can be further facilitated, with greater precision, by forming the rings 56, 58 with a taper/notch 76 shown on ring 56. Preferably, the taper/notch 76 will be smooth, as shown in FIG. 3. Alternatively, the taper/notch 76 can be formed as a series of steps (not shown). Also, as an alternative, instead of being formed on the rings 56, 58, the taper/notch 76 can be formed on the cartridge 40 (not shown). Moreover, the tangential path (i.e. axial offset) for fluid (liquid) entry into the recess 62 minimizes the distortion effect on the piston valve 52 that would otherwise result from the impact of a force directed toward the axis 46 of the piston valve 52.

With the above in mind, movements of the piston valve 52 effectively do not fight against the fluid flow through the solenoid valve 34. As noted above, movement of the piston valve 52 in the chamber 60 of cartridge 40 is crucial for controlling fluid flow. For example, with piston valve 52 in the position shown in FIG. 3, fluid flow (arrows 72) indicate a spiral path for fluid through the recess 62 from opening 48a to opening 50a. It will be appreciated, however, that a movement of the piston valve 52 by the solenoid 32 could be made which would position the ring 58 of piston valve 52 over the opening 50a, to thereby close the opening 50a. With the above in mind, other configurations between the position of rings 56, 58 and openings 48, 50 are contemplated by the present invention.

Figure 5A:
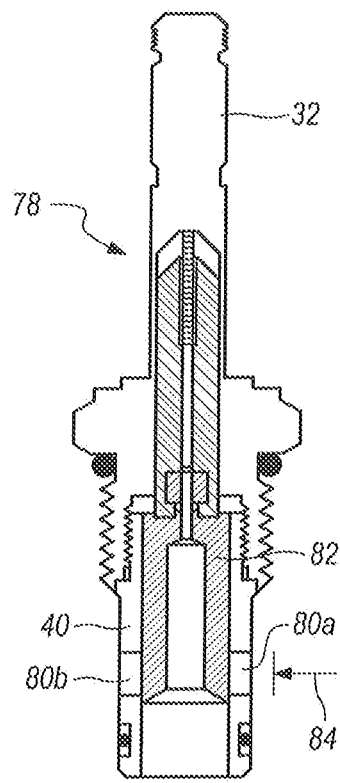
FIG. 5A is a cross-section view of a gate valve in a closed configuration in accordance with the present invention.
Figure 5B:
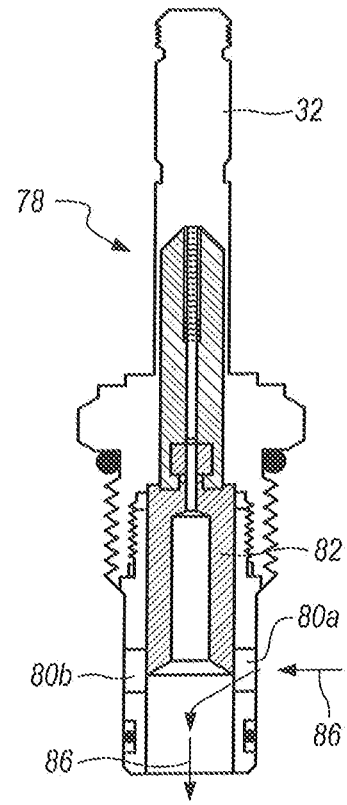
FIG. 5B is a cross-section view of the gate valve of FIG. 5A shown in an open configuration in accordance with the present invention.

In an alternate embodiment of the present invention, a gate valve 78 is shown in FIGS. 5A and 5B that essentially employs the fluid flow characteristics disclosed above. As shown, the gate valve 78 includes a cartridge 40 that is formed with openings 80a and 80b. A valve piston 82 is positioned for back and forth axial motion in the cartridge 40 in response to a solenoid 32 that is operationally connected to the valve piston 82. In its closed configuration (FIG. 5A), the gate valve 78 prevents fluid flow through the openings 80a and 80b of the gate valve 78 as indicated by blocked arrow 84. On the other hand, in response to activation by the solenoid 32, the valve piston 82 can be moved to clear the openings 80a and 80b (FIG. 5B) and thereby allow fluid flow through the gate valve 78, as indicated by the throughput arrows 86.

Figure 6:
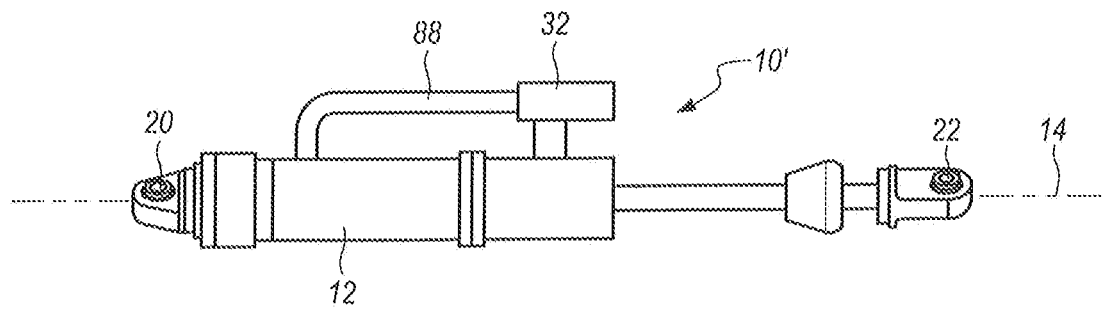
FIG. 6 is an elevation view of a shock absorber incorporating a by-pass component in accordance with the present invention.

For another alternate embodiment of the present invention, FIG. 6 shows a shock absorber 10' which incorporates a bypass 88. Again, a solenoid 32 is used to control fluid flow. As envisioned for the bypass 88 version for the shock absorber 10', the solenoid 32 can cooperate with either a solenoid valve 34 or a gate valve 78 as respectively disclosed above.

While the particular Electronically Adjustable Shock Absorber as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A mechanism for adjusting a shock absorber which comprises: a shock absorber containing a liquid; a cartridge mounted on a fluid path in fluid communication with the shock absorber, wherein the cartridge defines a longitudinal vertical axis and has a first end and a second end and is formed with an elongated cylindrical chamber therebetween with a plurality of openings into the chamber between the first and the second ends with at least one opening for receiving liquid from the shock absorber, where entire portion of said opening is in a direction tangential to the vertical axis of the cartridge, said opening is positioned in such manner that fluid starts flowing on only one side of said vertical axis of the cartridge, and wherein the first end of the cartridge is connected in fluid communication with the liquid chamber of a damping reservoir; a solenoid engaged with the second end of the cartridge; a piston valve positioned in the chamber of the cartridge for reciprocal movement therein in response to the solenoid; and a controller connected to the solenoid for moving the piston valve in the chamber of the cartridge to establish an open/close configuration for at least one opening of the cartridge to adjust the volume of liquid flow on the fluid path between the shock absorber and the liquid chamber of the damping reservoir.

2. The mechanism recited in claim 1 wherein the shock absorber comprises: a main body of the shock absorber for holding the liquid, wherein the main body defines an axis; a shock shaft including a drive piston engaged with the main body for reciprocal motion of the drive piston along the axis of the main body, wherein the main body is attached to a first point on a vehicle and the shock shaft is attached to a second point on the vehicle; a cylindrical shaped damping reservoir defining an axis, wherein the damping reservoir includes a gas chamber and a liquid chamber with a floating piston positioned therebetween for axial movement to compress gas in the gas chamber when liquid is introduced into the liquid chamber, and to expel liquid from the liquid chamber when gas expands in the gas chamber; and a manifold bridge defining a fluid path connecting the shock absorber in fluid communication with the liquid chamber of the damping reservoir via the cartridge.

3. The mechanism recited in claim 2 further comprising a one-way check valve mounted on the manifold bridge in fluid communication with the fluid path for returning liquid from the liquid chamber of the damping reservoir to the main body.

4. The mechanism recited in claim 2 further comprising a choke passageway in the fluid path between the main body of the shock absorber and the cartridge.

5. The mechanism recited in claim 2 further comprising a compression valve positioned between the main body of the shock absorber and the cartridge to relieve an excessive pressure increase on the cartridge.

6. The mechanism recited in claim 2 wherein the piston valve comprises: a hollow central tube having a distal end and a proximal end, wherein the central tube has an outer diameter $d_{tube}$; a first ring mounted on the central tube at the distal end thereof, the first ring having an outer diameter $d_{ring}$, wherein $d_{ring} > d_{tube}$; and a second ring mounted on the central tube at the proximal end thereof, the second ring having the same outer diameter $d_{ring}$, wherein a recess is formed around the central tube between the first ring and the second ring to define the flow path through the cartridge.

7. The mechanism recited in claim 6 wherein the first ring of the piston valve and the second ring of the piston valve each abuts the cartridge from inside its chamber for movement of the piston valve in the chamber to vary a cross-section area of the at least one opening to adjust the volume of the liquid flow therethrough.

8. The mechanism recited in claim 7 wherein the first ring of the piston valve and the second ring of the piston valve are each formed with a taper/notch to provide for an incremental transition of the cross-section area of the opening between the open/close configurations of the opening of the cartridge.

9. The mechanism recited in claim 1 wherein the liquid is a hydraulic/mineral type oil.

10. The mechanism recited in claim 1 wherein the controller is an electronic control device.

11. A mechanism for adjusting a shock absorber wherein the shock absorber contains a liquid and includes a main body for holding the liquid, wherein the main body defines an axis, and the shock absorber further includes a shock shaft including a drive piston engaged with the main body for reciprocal motion of the drive piston along the axis of the main body, and wherein the main body is attached to a first point on a vehicle and the shock shaft is attached to a second point on the vehicle, the mechanism comprising: a damping reservoir for interacting with the shock absorber, wherein the damping reservoir is in fluid communication with the shock absorber and includes a gas chamber and a liquid chamber with a floating piston positioned therebetween for axial movement to compress gas in the gas chamber when liquid is introduced into the liquid chamber, and to expel liquid from the liquid chamber when gas expands in the gas chamber; a cartridge for establishing a portion of a fluid path between the main body of the shock absorber and the damping reservoir, wherein the cartridge defines a longitudinal vertical axis and has a first end and a second end and is formed with an elongated cylindrical chamber therebetween with a plurality of openings into the chamber between the first and second ends with at least one opening for receiving liquid from the shock absorber, where entire portion of said opening is in a direction tangential to the vertical axis of the cartridge, said opening is positioned in such manner that fluid starts flowing on only one side of said vertical axis of the cartridge, and wherein the first end of the cartridge is connected in fluid communication with the liquid chamber of the damping reservoir; and a means for moving a piston valve in the chamber of the cartridge to establish an open/close configuration for the at least one opening of the cartridge to adjust the volume of liquid flow on the fluid path between the shock absorber and the liquid chamber of the damping reservoir.

12. The mechanism recited in claim 11 wherein the means for moving the piston valve is a solenoid engaged with the second end of the cartridge.

13. The mechanism recited in claim 11 further comprising a one-way check valve positioned in the fluid path for returning liquid from the liquid chamber of the damping reservoir to the main body of the shock absorber.

14. The mechanism recited in claim 11 further comprising a choke passageway in the fluid path between the main body of the shock absorber and the cartridge.

15. The mechanism recited in claim 11 further comprising a compression valve positioned between the main body of the shock absorber and the cartridge to relieve an excessive pressure increase on the cartridge.

16. The mechanism recited in claim 11 wherein the piston valve comprises: a hollow central tube having a distal end and a proximal end, wherein the central tube has an outer diameter $d_{tube}$; a first ring mounted on the central tube at the distal end thereof, the first ring having an outer diameter $d_{ring}$, wherein $d_{ring} > d_{tube}$; and a second ring mounted on the central tube at the proximal end thereof, the second ring having the same outer diameter $d_{ring}$, wherein a recess is formed around the central tube between the first ring and the second ring to define the flow path through the cartridge.

17. The mechanism recited in claim 11 wherein the first ring of the piston valve and the second ring of the piston valve each abut with the cartridge for movement of the piston valve in the chamber of the cartridge to vary a cross-section area of the at least one opening to adjust the volume of the liquid flow therethrough.

18. The mechanism recited in claim 17 wherein the first ring of the piston valve and the second ring of the piston valve are each formed with a taper/notch to provide for an incremental transition of the cross-section area of the opening between the open/close configurations of the opening of the cartridge.

19. A method for assembling an electronically adjustable shock absorber wherein the shock absorber contains a liquid and includes a main body for holding the liquid, wherein the main body defines an axis, and the shock absorber further includes a shock shaft including a drive piston engaged with the main body for reciprocal motion of the drive piston along the axis of the main body, wherein the main body is attached to a first point on a vehicle and the shock shaft is attached to a second point on the vehicle, the method comprising the steps of: connecting a cylindrical shaped damping reservoir in fluid communication with the main body of the shock absorber, wherein the damping reservoir includes a gas chamber and a liquid chamber with a floating piston positioned therebetween for axial movement to compress gas in the gas chamber when liquid is introduced into the liquid chamber, and to expel liquid from the liquid chamber when gas expands in the gas chamber; establishing a portion of a fluid path between the main body of the shock absorber and the damping reservoir with a cartridge, wherein the cartridge defines a longitudinal vertical axis and has a first end and a second end and is formed with an elongated cylindrical chamber therebetween with a plurality of openings into the chamber between the first and second ends with at least one opening for receiving liquid from the shock absorber, where entire portion of said opening is in a direction tangential to the vertical axis of the cartridge, said opening is positioned in such manner that fluid starts flowing on only one side of said vertical axis of the cartridge, and wherein the first end of the cartridge is connected in fluid communication with the liquid chamber of the damping reservoir; and electronically moving a piston valve in the chamber of the cartridge using a solenoid engaged with the second end of the cartridge to establish an open/close configuration for the at least one opening of the cartridge to adjust the volume of liquid flow on the fluid path between the shock absorber and the liquid chamber of the reservoir.

20. The method recited in claim 19 wherein the piston valve comprises: a hollow central tube having a distal end and a proximal end, wherein the central tube has an outer diameter $d_{tube}$; a first ring mounted on the central tube at the distal end thereof, the first ring having an outer diameter $d_{ring}$, wherein $d_{ring} > d_{tube}$; and a second ring mounted on the central tube at the proximal end thereof, the second ring having the same outer diameter $d_{ring}$, wherein a recess is formed around the central tube between the first ring and the second ring to define the flow path through the cartridge, wherein the first ring of the piston valve and the second ring of the piston valve each abut with the cartridge for movement of the piston valve in the chamber of the cartridge to vary a cross-section area of the at least one opening to adjust the volume of the liquid flow therethrough, and wherein the first ring of the piston valve and the second ring of the piston valve are each formed with a taper/notch to provide for an incremental transition of the cross-section area of the opening between the open/close configurations of the opening of the cartridge.

\* \* \* \* \*